US012646063B2

(12) United States Patent
Sinha et al.

(10) Patent No.: US 12,646,063 B2
(45) Date of Patent: Jun. 2, 2026

(54) SPLIT SECRET CRYPTOGRAPHY BASED SECURITY IN IOT IMPLEMENTED PAYMENT TRANSACTIONS OR CREDENTIALS

(71) Applicant: MASTERCARD INTERNATIONAL INCORPORATED, Atlanta, GA (US)

(72) Inventors: Ajay Sinha, Maharashtra (IN); Lalit Manchanda, Haryana (IN); Naveen Kumar Gupta, Maharashtra (IN); Bhargav Jagdishchandra Modi, Gujarat (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 422 days.

(21) Appl. No.: 17/869,778

(22) Filed: Jul. 20, 2022

(65) Prior Publication Data

US 2023/0024789 A1    Jan. 26, 2023

(30) Foreign Application Priority Data

Jul. 21, 2021    (IN) ............................. 202111032858

(51) Int. Cl.
G06Q 20/40        (2012.01)
G06Q 20/30        (2012.01)

(52) U.S. Cl.
CPC ......... G06Q 20/401 (2013.01); G06Q 20/308 (2020.05); *G06Q 2220/00* (2013.01)

(58) Field of Classification Search
None
See application file for complete search history.

(56)        References Cited

U.S. PATENT DOCUMENTS

| | | | |
|---|---|---|---|
| 11,057,210 B1 * | 7/2021 | Sierra | ................... H04L 9/3226 |
| 2002/0071565 A1 * | 6/2002 | Kurn | .................... G06F 21/604 |
| | | | 380/281 |
| 2019/0035018 A1 * | 1/2019 | Nolan | ................ G06Q 20/3829 |
| 2021/0327002 A1 * | 10/2021 | Becher | .................. H04L 9/0825 |
| 2022/0321339 A1 * | 10/2022 | Yedluri | ................. H04L 9/0894 |

* cited by examiner

*Primary Examiner* — Jamie R Kucab
(74) *Attorney, Agent, or Firm* — Harness, Dickey & Pierce, P.L.C.

(57)        ABSTRACT

The invention provides methods, systems and computer program products for securely provisioning an internet-of-things (IoT) device for implementing an electronic payment transaction. The invention comprises (i) retrieving a first credential element from the client device, and a second credential element from a router, (ii) generating payment credential data by applying split secret cryptography based reconstruction to the first credential element and the second credential element, (iii) retrieving a unique identifier associated with the IoT device, (iv) generating a combined data element comprising the payment credential data and the unique identifier associated with the IoT device, (v) applying split secret cryptography based splitting to the combined data element to generate a first verifiable secure element and a second verifiable secure element, (vi) storing the first verifiable secure element and the retrieved unique identifier within the router, and (vii) storing the second verifiable secure element within the IoT device.

6 Claims, 13 Drawing Sheets

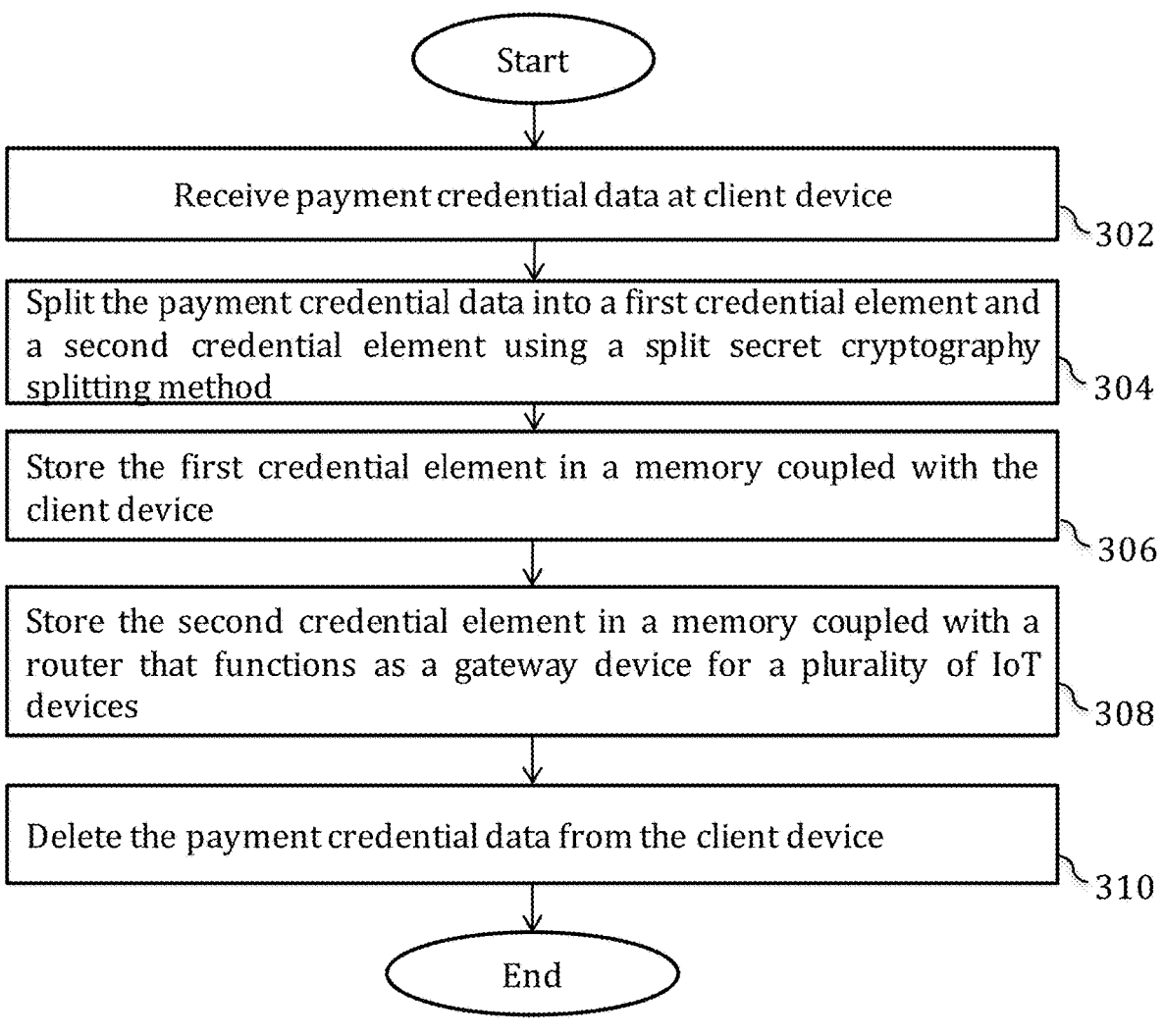

Start

Receive payment credential data at client device ⟍302

Split the payment credential data into a first credential element and a second credential element using a split secret cryptography splitting method ⟍304

Store the first credential element in a memory coupled with the client device ⟍306

Store the second credential element in a memory coupled with a router that functions as a gateway device for a plurality of IoT devices ⟍308

Delete the payment credential data from the client device ⟍310

End

| Unique Identifier of IoT Device | First verifiable secure element |
|---|---|
|  |  |
|  |  |
|  |  |

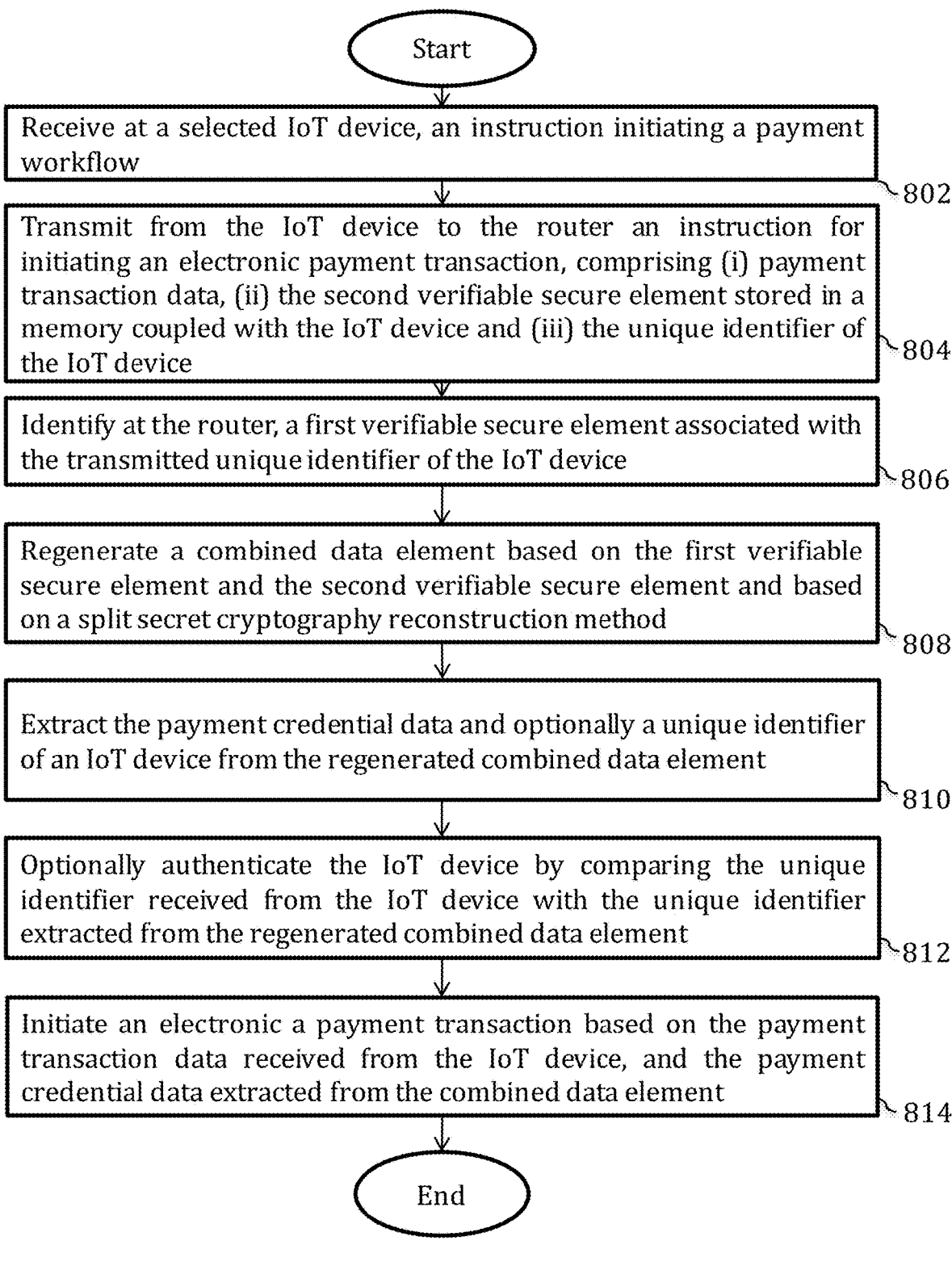

Start

Receive at a selected IoT device, an instruction initiating a payment workflow
～802

Transmit from the IoT device to the router an instruction for initiating an electronic payment transaction, comprising (i) payment transaction data, (ii) the second verifiable secure element stored in a memory coupled with the IoT device and (iii) the unique identifier of the IoT device
～804

Identify at the router, a first verifiable secure element associated with the transmitted unique identifier of the IoT device
～806

Regenerate a combined data element based on the first verifiable secure element and the second verifiable secure element and based on a split secret cryptography reconstruction method
～808

Extract the payment credential data and optionally a unique identifier of an IoT device from the regenerated combined data element
～810

Optionally authenticate the IoT device by comparing the unique identifier received from the IoT device with the unique identifier extracted from the regenerated combined data element
～812

Initiate an electronic a payment transaction based on the payment transaction data received from the IoT device, and the payment credential data extracted from the combined data element
～814

End

SPLIT SECRET CRYPTOGRAPHY BASED SECURITY IN IOT IMPLEMENTED PAYMENT TRANSACTIONS OR CREDENTIALS

FOREIGN PRIORITY

This application claims priority under 35 U.S.C. § 119 to Indian patent application 202111032858, filed Jul. 21, 2021, the disclosure of which is incorporated herein by reference.

FIELD OF THE INVENTION

The present invention relates to the domain of electronic payment transactions, and more particularly to systems, methods and computer program products for implementing split secret cryptography-based security for payment transactions or payment credentials implemented by internet-of-things (IoT) devices.

BACKGROUND OF THE INVENTION

The development of the IoT (Internet of Things) has rapidly led to IoT devices having capabilities for decision making and for initiating actions external to the IoT devices. Advances in payment technologies and in internet based online transaction technologies now enable IoT devices to initiate online purchase transactions and to conclude such transactions using electronic payments mechanisms (e.g. card based payments or digital wallet-based payments).

Notably, as with any other form of online payment transaction, IoT based transactions require both payment transaction data (e.g. payee identification data, payee account data, and transaction amount data) and payment credential data (e.g. a payment account number or payment card number of the payor) to be transmitted from an IoT device to a payment network or to another entity within an external electronic payment environment (for example, a merchant server, an acquirer server or an issuer server) for implementing the targeted transaction. This requires the IoT device to have access to payment credential data (which is typically stored within a memory of the IoT device).

However, IoT devices have been found to be susceptible to security threats and malicious attacks—and storing payment credential data within a memory of an IoT device can expose such data to the risk of misappropriation. On the other hand, without access to payment credential data, an IoT device would be unable to implement electronic payment transactions.

There is accordingly a need for solutions to enable IoT devices to securely access payment credential data, while protecting the payment credential data from security risks.

SUMMARY

The present invention relates to the domain of IoT based electronic payment transactions, and more particularly to systems, methods and computer program products for implementing split secret cryptography-based security for payment transactions or payment credentials that are implemented by IoT devices.

In an embodiment, the invention provides a method for securely provisioning an internet-of-things (IoT) device for implementing an electronic payment transaction. The method comprises implementing at a processor implemented client device, the steps of (i) retrieving a first credential element from a memory within the client device, and a second credential element from a router that is communicably coupled with each of the client device and the IoT device, wherein the first credential element and the second credential element have been generated by applying split secret cryptography based splitting to payment credential data, (ii) regenerating the payment credential data by applying split secret cryptography based reconstruction to the retrieved first credential element and the second credential element, (iii) retrieving a unique identifier associated with the IoT device, (iv) generating a combined data element comprising the regenerated payment credential data and the retrieved unique identifier associated with the IoT device, (v) applying split secret cryptography based splitting to the combined data element to generate a first verifiable secure element and a second verifiable secure element, (vi) storing the first verifiable secure element and the retrieved unique identifier in a memory within the router, wherein the first verifiable secure element and the retrieved unique identifier are mapped to each other, and (vii) storing the second verifiable secure element in a memory within the IoT device.

In an embodiment, the method comprises deleting from the client device one or more of the regenerated payment credential data, the combine data element, the first verifiable secure element and the second verifiable secure element.

The method can further comprise the steps of (i) in response to initiation of a payment workflow at the IoT device, receiving at the router, from the IoT device (a) payment transaction data, (b) the second verifiable secure element stored within the memory of the IoT device, and (c) the unique identifier associated with the IoT device, (ii) identifying a first verifiable secure element associated with the received unique identifier associated with the IoT device, from among data stored within the memory of the router, (iii) regenerating the combined data element by applying split secret cryptography based reconstruction to both of the identified first verifiable secure element associated with the received unique identifier associated with the IoT device and the second verifiable secure element received from the IoT device, (iv) extracting from the regenerated combined data element, the payment credential data, and (v) initiating the electronic payment transaction based on the payment transaction data received from the IoT device and the payment credential data extracted from the regenerated combined data element.

The method can comprise authenticating the IoT device by comparing the unique identifier associated with the IoT device that has been received from the IoT device, with a unique identifier extracted from the regenerated combined data element.

The invention additionally provides a system for securely provisioning an internet-of-things (IoT) device for implementing an electronic payment transaction, the system comprising a processor implemented client device, configured for (i) retrieving a first credential element from a memory within the client device, and a second credential element from a router that is communicably coupled with each of the client device and the IoT device, wherein the first credential element and the second credential element have been generated by applying split secret cryptography based splitting to payment credential data, (ii) regenerating the payment credential data by applying split secret cryptography based reconstruction to the retrieved first credential element and the second credential element, (iii) retrieving a unique identifier associated with the IoT device, (iv) generating a combined data element comprising the regenerated payment credential data and the retrieved unique identifier associated with the IoT device, (v) applying split secret cryptography based splitting to the combined data element to generate a first verifiable secure element and a second verifiable secure element, (vi) storing the first verifiable secure element and the retrieved unique identifier in a memory within the router, wherein the first verifiable secure element and the retrieved unique identifier are mapped to each other, and (vii) storing the second verifiable secure element in a memory within the IoT device.

In an embodiment of the system, the processor implemented client device is configured for deleting from the client device one or more of the regenerated payment credential data, the combine data element, the first verifiable secure element and the second verifiable secure element.

The system can be further configured for (i) in response to an instruction initiating a payment workflow at the IoT device, receiving at the router, from the IoT device (a) payment transaction data, (b) the second verifiable secure element stored within the memory of the IoT device, and (c) the unique identifier associated with the IoT device, (ii) identifying a first verifiable secure element associated with the received unique identifier associated with the IoT device, from among data stored within the memory of the router, (iii) regenerating the combined data element by applying split secret cryptography based reconstruction to both of the identified first verifiable secure element associated with the received unique identifier associated with the IoT device and the second verifiable secure element received from the IoT device, (iv) extracting from the regenerated combined data element, the payment credential data, and (v) initiating the electronic payment transaction based on the payment transaction data received from the IoT device and the payment credential data extracted from the regenerated combined data element.

The system can additionally be configured for authenticating the IoT device by comparing the unique identifier associated with the IoT device that has been received from the IoT device, with a unique identifier extracted from the regenerated combined data element.

In another embodiment, the invention provides computer program product for securely provisioning an internet-of-things (IoT) device for implementing an electronic payment transaction, comprising a non-transitory computer readable medium having a computer readable program code embodied therein, the computer readable program code comprising instructions for (i) retrieving a first credential element from a memory within the client device, and a second credential element from a router that is communicably coupled with each of the client device and the IoT device, wherein the first credential element and the second credential element have been generated by applying split secret cryptography based splitting to payment credential data, (ii) regenerating the payment credential data by applying split secret cryptography based reconstruction to the retrieved first credential element and the second credential element, (iii) retrieving a unique identifier associated with the IoT device, (iv) generating a combined data element comprising the regenerated payment credential data and the retrieved unique identifier associated with the IoT device, (v) applying split secret cryptography based splitting to the combined data element to generate a first verifiable secure element and a second verifiable secure element, (vi) storing the first verifiable secure element and the retrieved unique identifier in a memory within the router, wherein the first verifiable secure element and the retrieved unique identifier are mapped to each other, and (vii) storing the second verifiable secure element in a memory within the IoT device.

BRIEF DESCRIPTION OF THE ACCOMPANYING DRAWINGS

FIG. 3 is a flowchart illustrating a method of securely provisioning a client device and a router within the system environment of FIG. 1 with split secret shares of payment credential data.

FIG. 7 illustrates an exemplary data structure of a kind that can be used within a router for mapping split secret shares that have been provisioned within one or more IoT devices within the system environment of FIG. 1.

FIG. 8 is a flowchart illustrating a method for enabling an IoT device within the system environment of FIG. 1 to implement a payment transaction using payment credential data reconstructed from split secret shares in accordance with the teachings of the present invention.

DETAILED DESCRIPTION

The present invention provides systems, methods and computer program products for implementing split secret cryptography based security for payment transactions or payment credentials that are implemented by IoT devices.

For the purposes of the present invention, the following terms shall be understood to have the corresponding meanings provided below.

"Acquirer" shall mean a business (e.g., a financial institution or a merchant bank) that contracts with a merchant or payee to coordinate with an issuer of a payor's payment card or payment account.

"Client device" shall refer to any electronic device having data processing and network communication capabilities that is configured to enable a user to access and control router(s) and/or IOT devices. In an embodiment, a client device can comprise an appropriately configured computing device or mobile communication device.

"IoT device" shall refer to an electronic device having data processing and network communication capabilities, and that is configured for operations based on one or more IoT communication protocols.

"Issuer" shall mean a financial institution that issues payment cards or payment accounts to users.

"Payee" shall mean an individual or entity receiving an electronic payment.

"Payment credential data" shall mean any of a payment account identifier, a payment card identifier, an electronic transaction account identifier, a bank account identifier, an electronic wallet identifier, or any other payment credential that can be necessary to implement a payment transaction involving any of the above.

"Payment account" shall mean any account that can be used for the purposes of effecting an electronic payment or electronic transaction, and shall include any electronic transaction account, payment card account, bank account or electronic wallet account.

"Payment card" shall mean a card or data associated with a payment account that can be provided to a customer or payor in order to enable a financial transaction via the associated payment account. Payment cards can include credit cards, debit cards, charge cards, stored-value cards, prepaid cards, fleet cards, virtual payment numbers, virtual card numbers, controlled payment numbers, etc.

"Payment network" shall refer to any intermediary network communicatively disposed between any two or more of a merchant server, acquirer bank server and issuer bank server. In certain embodiments, the payment network can comprise a card network that enables communication between the issuer bank and the acquirer bank (for example, Mastercard® or Visa®). In such embodiments, the card network primarily coordinates payment card transactions between acquirers and issuers, and additionally coordinates clearing and settlement services to transfer payments from issuers to payees.

"Payor" can be used to designate an individual or entity making an electronic payment.

Figure 1:
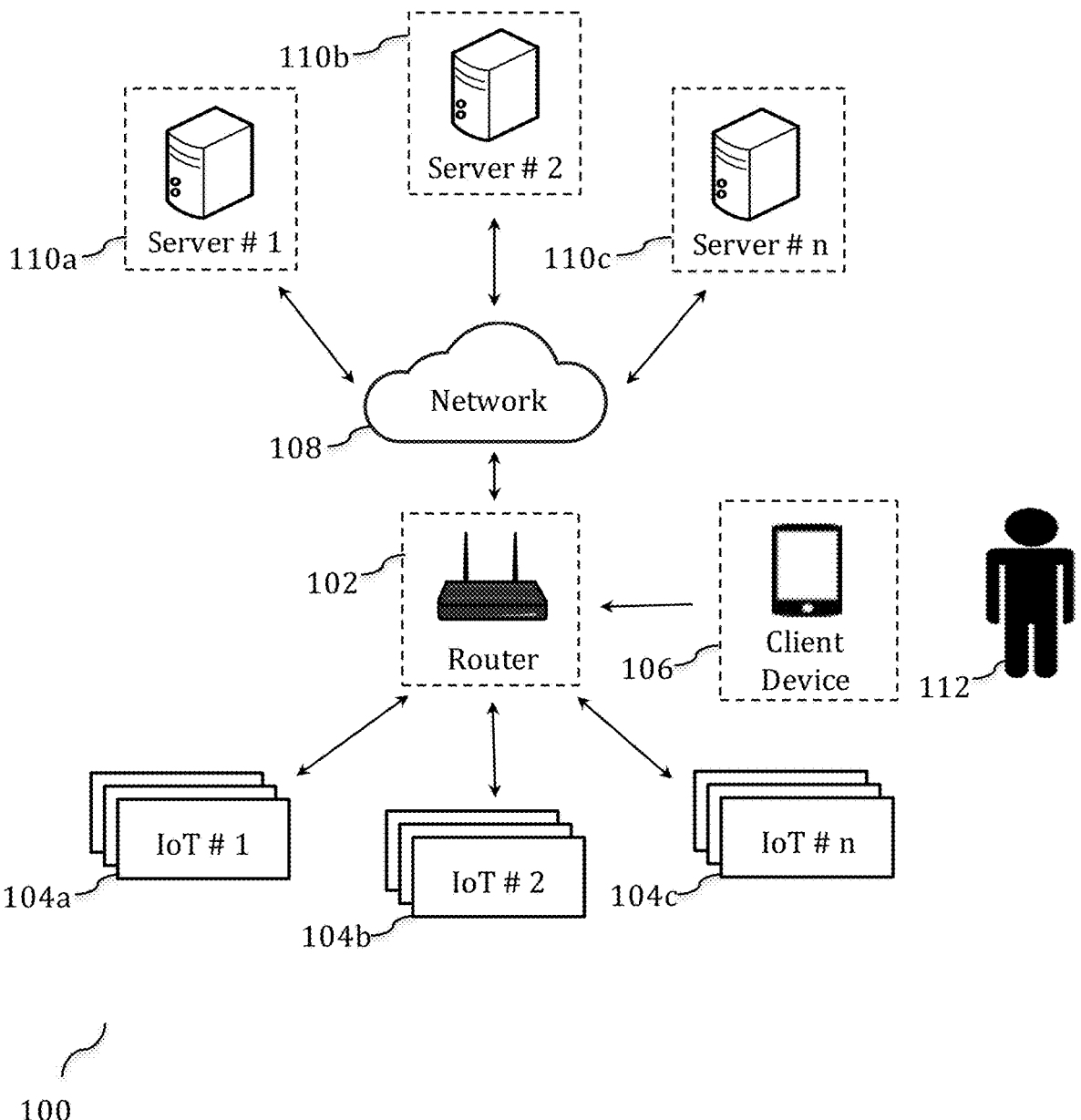
FIG. 1 illustrates a system environment for implementing secure IoT device based payment transactions in accordance with the present invention.

FIG. 1 illustrates a system environment 100 for implementing secure IoT device based payment transactions in accordance with the present invention. As shown in FIG. 1, system environment 100 comprises a router 102 that is communicably coupled with each of IoT devices #1 to n (104a, 104b, 104c) and which is configured to function as a gateway device between the IoT devices and an external network 108. Router 102 is configured to enable communications from, to and between IoT devices #1 to n based on one or more network communication protocols and/or IoT device protocols.

System environment 100 additionally includes client device 106. Client device 106 can be configured to communicate with router 102 for the purposes of enabling a user 112 to control, access or configure either router 102 or one or more of IoT devices #1 to n (104a to 104c) through router 102.

Router 102 is configured to communicate with (and to enable client device 106 and IoT devices #1 to n to communicate with) network 108—wherein network 108 can comprise any data network or internetwork (for example the Internet). Network 108 can in turn enable communication between client device 106 and IoT devices #1 to n at one end, and one or more of servers #1 to n (110a, 110b, 110c) at the other end. In an embodiment, one or more of servers #1 to n (110a to 110c) can comprise any of merchant servers, payee communication devices, payment network servers, issuer bank servers, acquirer bank servers and/or online transaction servers.

Split secret cryptography comprises one or more cryptographic methods for implementing secure distributed protocols. Split secret cryptography allows confidential or protected data to be split into a number of fragments or shares, and subsequent distribution of the shares across a plurality of entities during a secret sharing phase. This confidential or protected data can subsequently be accessed only during a secret reconstruction phase, by retrieving a number of these shares from across the entities at which they have been individual stored, and combining the shares in a manner that satisfies certain predefined parameters or rules.

By way of a brief explanation, split secret cryptographic methods typically involve a pair of algorithms (Split, Reconstruct) that together allow splitting of data Y into a plurality of fragments or shares $S=\{s_1, s_2, \ldots s_n\}$ (i.e. into n shares). These n shares are distributed across a plurality of entities (i.e. across n' entities) such that $P=(\{e_1, e_2, \ldots e_n\}$, n'<=n)—i.e. the number of entities n' ($e_1$ to $e_{n'}$) across which the n shares are distributed is less than or equal to the number of shares n into which the data has been split. Each of the entities ($e_1$ to $e_{n'}$) receives at least one share. Reconstruction of the data Y is possible using a minimum prescribed number of the shares n"—wherein this prescribed number n" is greater than 1 and less than or equal to the total number of shares n. Knowledge of less than n" shares prevents reconstruction of the data Y. In addition to depending on the splitting and reconstruction methods involved, one or more additional conditions or rules can be required to be satisfied before data Y can be reconstructed even with access to the n" shares.

A well known method for split secret cryptography has been proposed by Adi Shamir (Shamir's Secret Sharing (SSS))—however there are also several other methods and algorithms that are also known and which can be implemented for the purposes of implementing split secret cryptography for the purposes of the present invention.

Figure 2:
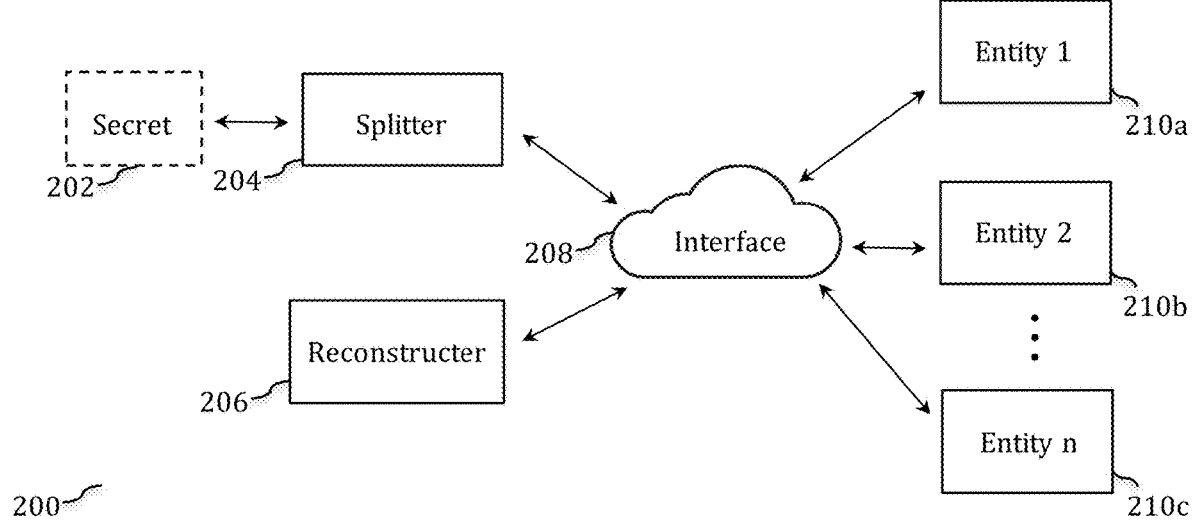
FIG. 2 illustrates the interaction between entities necessary for implementing split secret cryptography solutions.

For the purposes of explaining the invention, FIG. 2 illustrates the interaction between entities within a system environment 200 for implementing split secret cryptography solutions.

As shown in FIG. 2, the system environment 200 includes a splitter 204 and a reconstructer 206. Splitter 204 is configured to split secret 202 into n shares. These n shares are distributed by splitter 204 across a plurality of entities i.e. across entities 1 to n (210a, 210b, 210c) through interface 208. Each of the n entities (201a to 210c) receives at least one share. Reconstruction of secret 202 is achieved by reconstructer 206—which retrieves a plurality of the shares from one or more of entities 1 to n through interface 208, and which reconstructs secret 202 using a minimum prescribed number of the shares—wherein this prescribed number is greater than 1 and less than or equal to the total number of shares n.

FIGS. 3 to 6 as described below illustrate methods by which one or more IoT devices within the system environment 100 of FIG. 1 can be provisioned for secure payment transaction implementation using split secret cryptography.

FIG. 3 is a flowchart illustrating a method of securely provisioning a client device 106 and a router 102 (or any other gateway device that connects to IoT devices) within system environment 100 of FIG. 1, with split secret shares of payment credential data. In an embodiment of the invention, the method of FIG. 3 can be initiated by client device 106 based on an instruction or input from user 112, and in a further embodiment, the method can be partially or wholly implemented within client device 106.

Step 302 comprises receiving payment credential data at client device 106. The payment credential data can be transmitted to client device 106 or can be input at client device 106 by a user 112.

At step 304, the received payment credential data is split into a first credential element and a second credential element using a split secret cryptography splitting method—for example using any split secret cryptography splitting method that is consistent with the description hereinabove. By way of a working example:

For payment credential data $P_m$, the payment credential data can be split into shares based on a split secret cryptography splitting function represented as:

$$func\_split(P_m,m,n)=S1,S2 \ldots Sn$$

wherein (i) "m" represents number of shares the payment credential data should be split into (ii) "n" represents how many shares are required to reconstruct the payment credential data, (iii) m≥n, (iv) S1 is the first credential element generated by the function, (v) S2 is the second credential element generated by the function and (vi) Sn is the nth credential element generated by the function.

For the purposes of step 304, since the payment credential data is being split into a first credential element and a second credential element (i.e. one for each of the client device and the router), m=n=2; since the objective is to split the payment credential data in 2 parts, and also to require both parts for subsequent reconstruction of the same payment credential data. Accordingly, the payment credential data $P_m$ will be split into two shares S1 and S2 and both S1 and S2 will be required for reconstruction of payment credential data $P_m$.

In particular embodiments, where the objective includes providing for a recovery key in a secure memory or on the cloud (so that in case of loss of a share from the client device or router, the payment credential data can still be recovered), the value of m can be selected such that m=3 (or any other larger value), while n=2. The additional share can be stored in a secure location in the cloud and can be used for reconstructing the payment credential data in case of a loss of the client device or router, or in case of destruction of a share stored in either one.

Thereafter, the payment credential $P_m$ can be regenerated based on the first and second credential elements S1 and S2, based on a split secret cryptography reconstruction function represented as:

$$func\_join(S1,S2)=P_m$$

At step 306, the first credential element is stored in a memory within or coupled with client device 106 (for example within a non-transitory memory storage within client device 106).

At step 308, the second credential element is stored in a memory within or coupled with router 102 (for example within a non-transitory memory storage within router 102).

Step 310 comprises deleting the payment credential data from client device 106.

Figure 4:
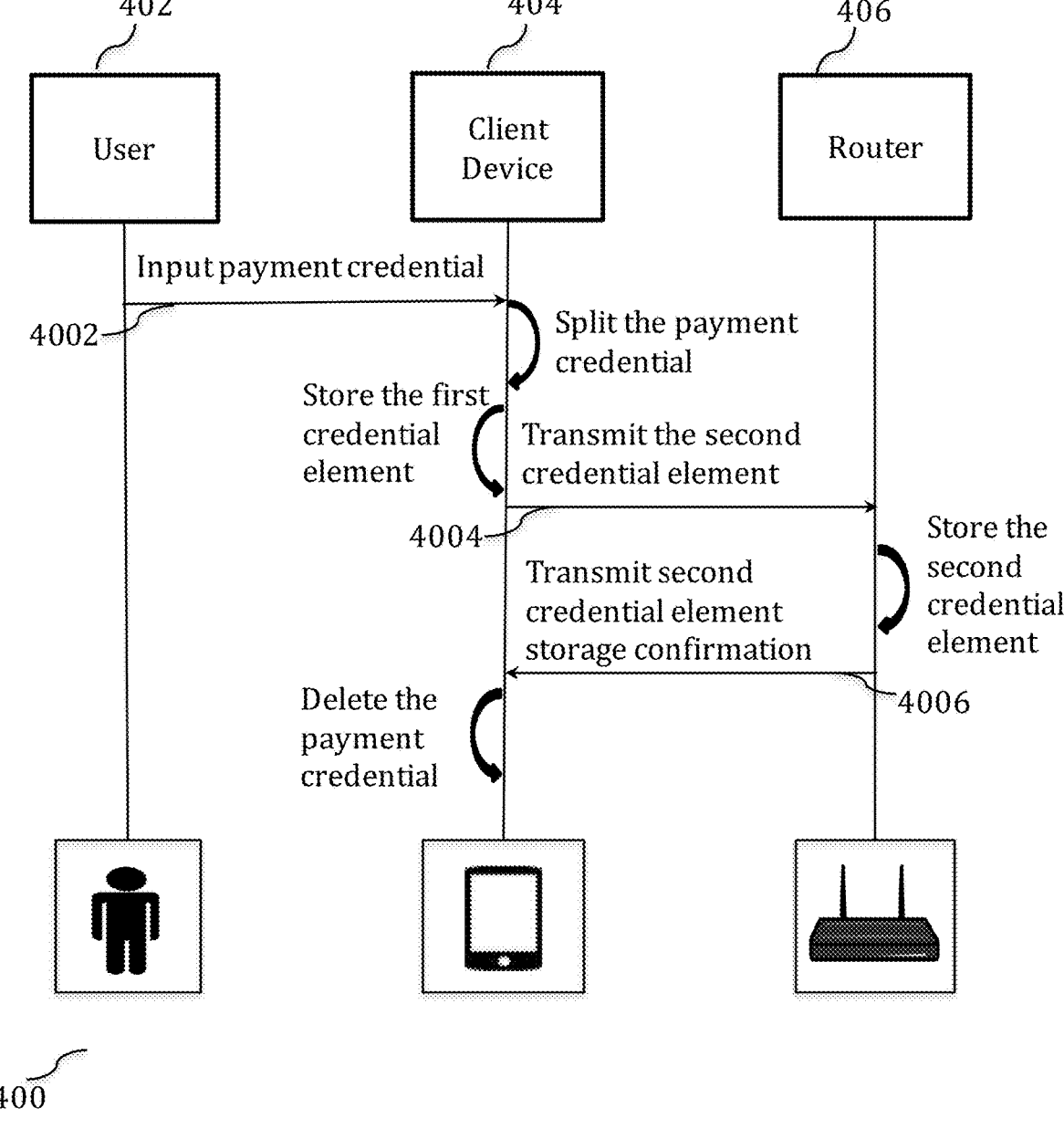
FIG. 4 is a communication flow diagram illustrating the process flow communication between system entities involved in implementing the method of FIG. 3.

FIG. 4 is a communication flow diagram illustrating the process flow communication between system entities involved in implementing the method of FIG. 3.

As illustrated in FIG. 4, the communication flow commences at step 4002 wherein user 402 inputs a payment credential at client device 404.

Client device 404 splits the received payment credential data into a first credential element and a second credential element using a split secret cryptography splitting method—for example using any split secret cryptography splitting method that is consistent with the description hereinabove.

Client device 404 stores the first credential element in a memory within or coupled with client device 404 (for example within a non-transitory memory storage within the client device 404). At step 4004, client device 404 transmits the second credential element to router 406. The second credential element is stored in a memory within or coupled with router 406 (for example within a non-transitory memory storage within router 406).

At step 4006, router 406 transmits back to client device 404, a data message confirming successful storage of the second credential element at router 406.

Client device 404 thereafter deletes the payment credential data from client device 404.

It would be understood that as a result of implementing the methods of FIG. 3 and/or FIG. 4, a client device and a router are respectively provided with one of two split secret cryptography shares (i.e. the first credential element and second credential element respectively). Together the two split secret cryptography shares enable the client device to regenerate payment credential data (by using a split secret cryptography reconstruction method) at any point of time, without requiring to store the payment credential data permanently on either the client device or the router. This reduces the risk of misappropriation of the payment credential data.

Figure 5:
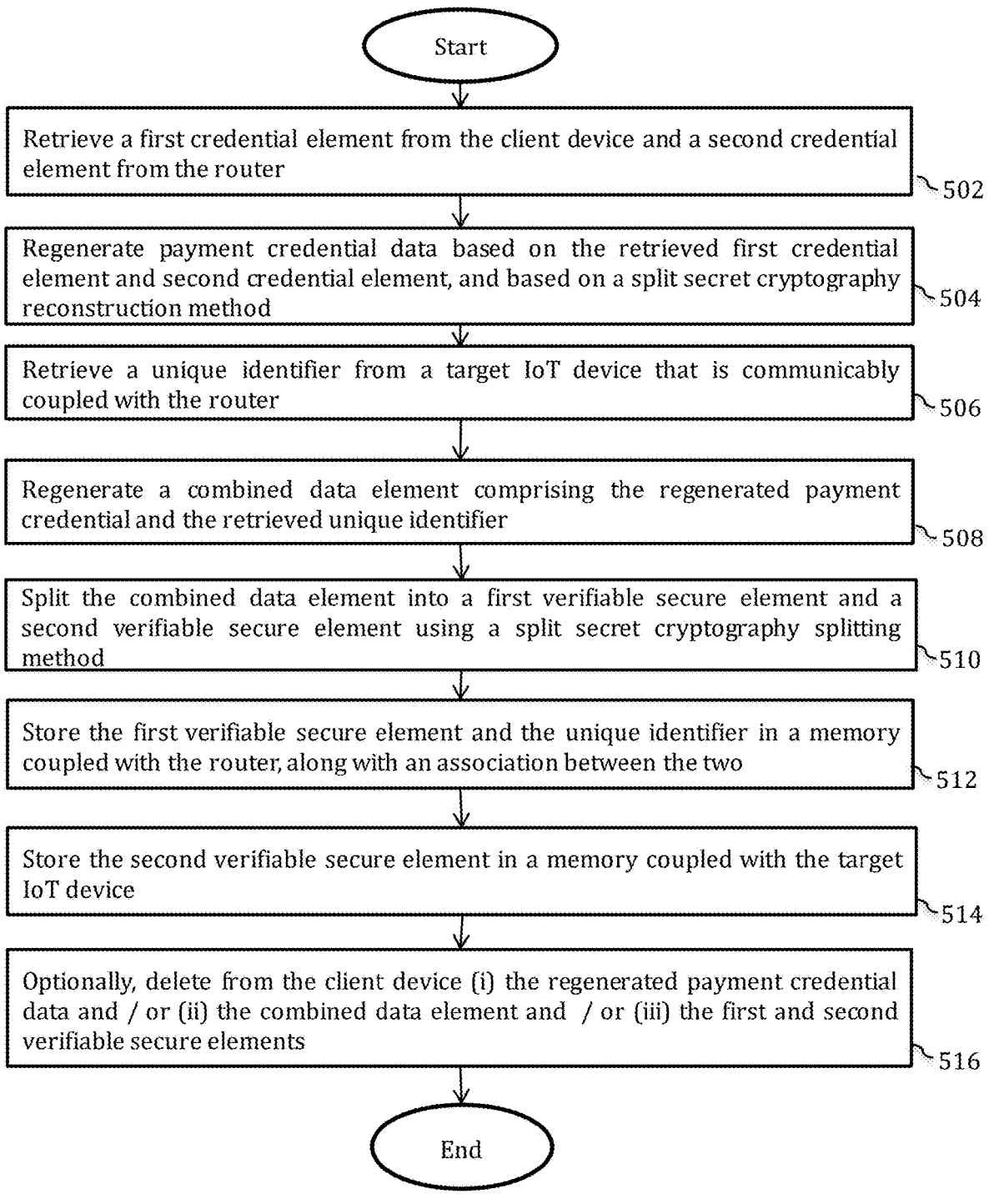
FIG. 5 is a flowchart illustrating a method of securely provisioning each IoT device within the system environment of FIG. 1 with a split secret share of payment credential data.

FIG. 5 is a flowchart illustrating a method of securely provisioning an IoT device (104a to 104c) within the system environment 100 of FIG. 1 with a split secret share of payment credential data. Implementing the method of FIG. 5 involves client device 106 and router 102 that have respectively, already been provisioned with a first credential element and a second credential element in accordance with the teachings of the methods of FIG. 3 and/or FIG. 4, and additionally involves a target IoT device (any of 104a to 104c) that is connected to router 102. In an embodiment, the method steps of FIG. 5 can be implemented at client device 106.

Step 502 comprises retrieving a first credential element from client device 106 and a second credential element from router 102—wherein each of the first credential element and the second credential element have been generated in accordance with the teachings of the method of FIG. 3 and/or FIG. 4.

Step 504 comprises regenerating payment credential data based on the retrieved first credential data and second credential data, using a split secret cryptography reconstruction method. The split secret cryptography reconstruction method can correspond to (or comprise a complement of) the split secret cryptography splitting method that has been used to generate the first credential data and second credential data from the payment credential data.

Step 506 comprises retrieving a unique identifier from a target IoT device (104a to 104c) that is communicably coupled with router 102. The unique identifier can comprise any unique identifier associated with the target IoT device—for example, the unique identifier can comprise a MAC address of the target IoT device or a static IP address of the target IoT device Step 508 comprises generating a combined data element comprising the regenerated payment credential data (that has been regenerated at step 504) and the retrieved unique identifier associated with the target IoT device (that has been retrieved at step 506). In an embodiment, generating the combined data element can comprise concatenating the regenerated payment credential and the retrieved unique identifier into a combined data element. However, any other alternative method or function for combining the two can also be used.

Step 510 comprises splitting the combined data element that has been generated at step 508 into a first verifiable secure element and a second verifiable secure element (i.e. into two split secret shares) using a split secret cryptography splitting method that is consistent with the description hereinabove. In an embodiment, the split secret cryptography splitting method used at step 510 can comprise the same method that has been used to generate the first payment credential and the second payment credential at step 304 of the method of FIG. 3. In another embodiment, the split secret cryptography splitting method used at step 510 can comprise a method that is different from the method that has been used to generate the first payment credential and the second payment credential at step 304 of the method of FIG. 3.

Step 512 comprises storing the first verifiable secure element and the unique identifier of the target IoT device in a memory within, or coupled with, router 102. The first verifiable secure element and the corresponding unique identifier of the target IoT device can be stored in a manner that maps an association between the two. FIG. 7 illustrates an exemplary data structure 700 that that can be used to store the first verifiable secure element (stored as a data element in a data row within column 704) and the corresponding unique identifier of the target IoT device (stored as a data element in the same data row, within column 702) and thereby map the two to each other (the mapping is achieved by virtue of both data elements being stored within the same data row). It would be understood that the exemplary data structure 700 can be used to store first verifiable secure elements and corresponding unique identifiers of IoT devices for each unique router—IoT device pair within a system environment for which first and second verifiable secure elements are generated in accordance with the teachings of the method of FIG. 5.

Step 514 comprises storing the second verifiable secure element in a memory within or coupled with the target IoT device.

Step 516 comprises optionally deleting from client device 106 (*i*) the regenerated payment credential data and/or (ii) the combined data element and/or (iii) the first and second verifiable secure elements.

The method of FIG. 5 can be separately implemented for each of multiple IoT devices connected to router 102—and a separate and unique pair of first and second verifiable secure elements will be generated for each unique router-IoT device pair.

Figure 6:
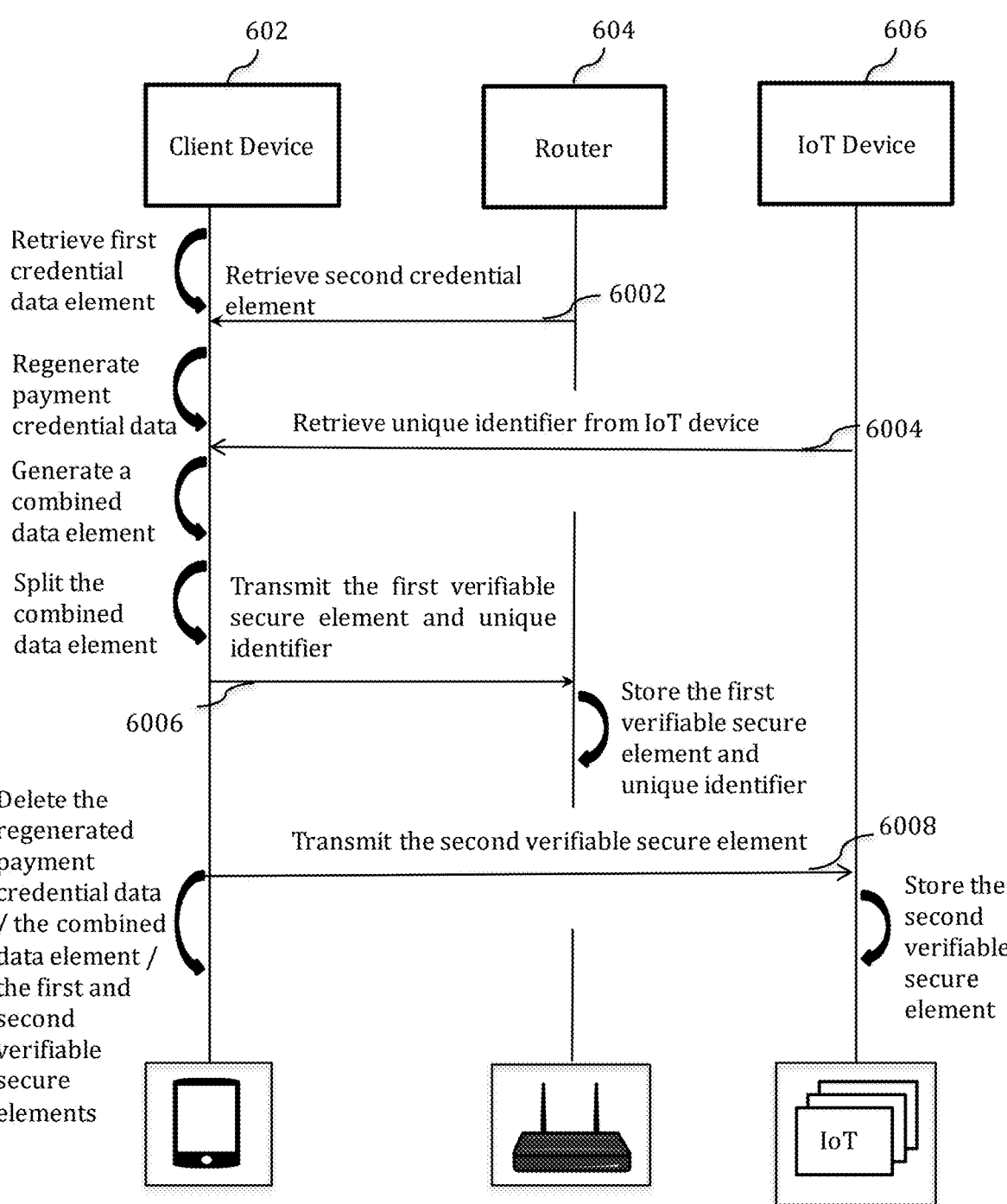
FIG. 6 is a communication flow diagram illustrating the process flow communication between system entities involved in implementing the method of FIG. 5.

FIG. 6 is a communication flow diagram illustrating the process flow communication between system entities involved in implementing the method of FIG. 5.

As illustrated in FIG. 6, the communication flow commences at client device 602—by retrieving from a memory of the client device 106, a first credential element that has been generated in accordance with the teachings of the method of FIG. 3.

Thereafter at step 6002, client device 602 retrieves from router 604, a second credential element that has been generated in accordance with the teachings of the method of FIG. 3.

Client device 602 regenerates payment credential data based on the retrieved first credential data and second credential data, using a split secret cryptography reconstruction method. The split secret cryptography reconstruction method can correspond to (or comprise a complement of) the split secret cryptography splitting method that has been used to generate the first credential data and second credential data from the payment credential data.

At step 6004, client device 602 retrieves from a target IoT device 606 that is connected to router 604, a unique identifier corresponding to said target IoT device 606. The unique identifier can comprise any unique identifier associated with the target IoT device 606—for example, the unique identifier can comprise a MAC address of the target IoT device 606 or a static IP address of the target IoT device 606.

Client device 602 generates a combined data element comprising the regenerated payment credential and the retrieved unique identifier associated with target IoT device 606 (that has been retrieved at step 6004). In an embodiment, generating the combined data element can comprise simply concatenating the regenerated payment credential and the retrieved unique identifier into a combined data element. However, any other alternative method or function for combining the two can also be used.

Client device 602 then splits the combined data element that has been generated, into a first verifiable secure element and a second verifiable secure element (i.e. into two split secret shares) using a split secret cryptography splitting method that is consistent with the description hereinabove. In an embodiment, the split secret cryptography splitting method can comprise the same method that has been used to generate the first payment credential and the second payment credential. In another embodiment, the split secret cryptography splitting method used by client device 602 can comprise a method that is different from the method that has been used to generate the first payment credential and the second payment credential.

At step 6006, client device 602 transmits the first verifiable secure element and unique identifier of target IoT device 606, to router 604. Router 604 stores the first verifiable secure element and the unique identifier of target IoT device 606 in a memory within or coupled with router 604—for example, within a data structure 700 of the type illustrated in and described in connection with FIG. 7. The first verifiable secure element and the corresponding unique identifier of target IoT device 606 can be stored in a manner that maps an association between the two.

At step 6008, client device 602 transmits the second verifiable secure element to target IoT device 606. The transmission at step 6008 can be direct or through router 604. The second verifiable secure element is thereafter stored by target IoT device 606 in a memory within or coupled with target IoT device 606.

Client device 602 thereafter deletes (i) the regenerated payment credential data and/or (ii) the combined data element and/or (iii) the first and second verifiable secure elements.

It would be understood that the communication flow of FIG. 6 would occur for each instance of generating a pair of first and second verifiable secure elements for each unique router-IoT device pair.

Figure 9:
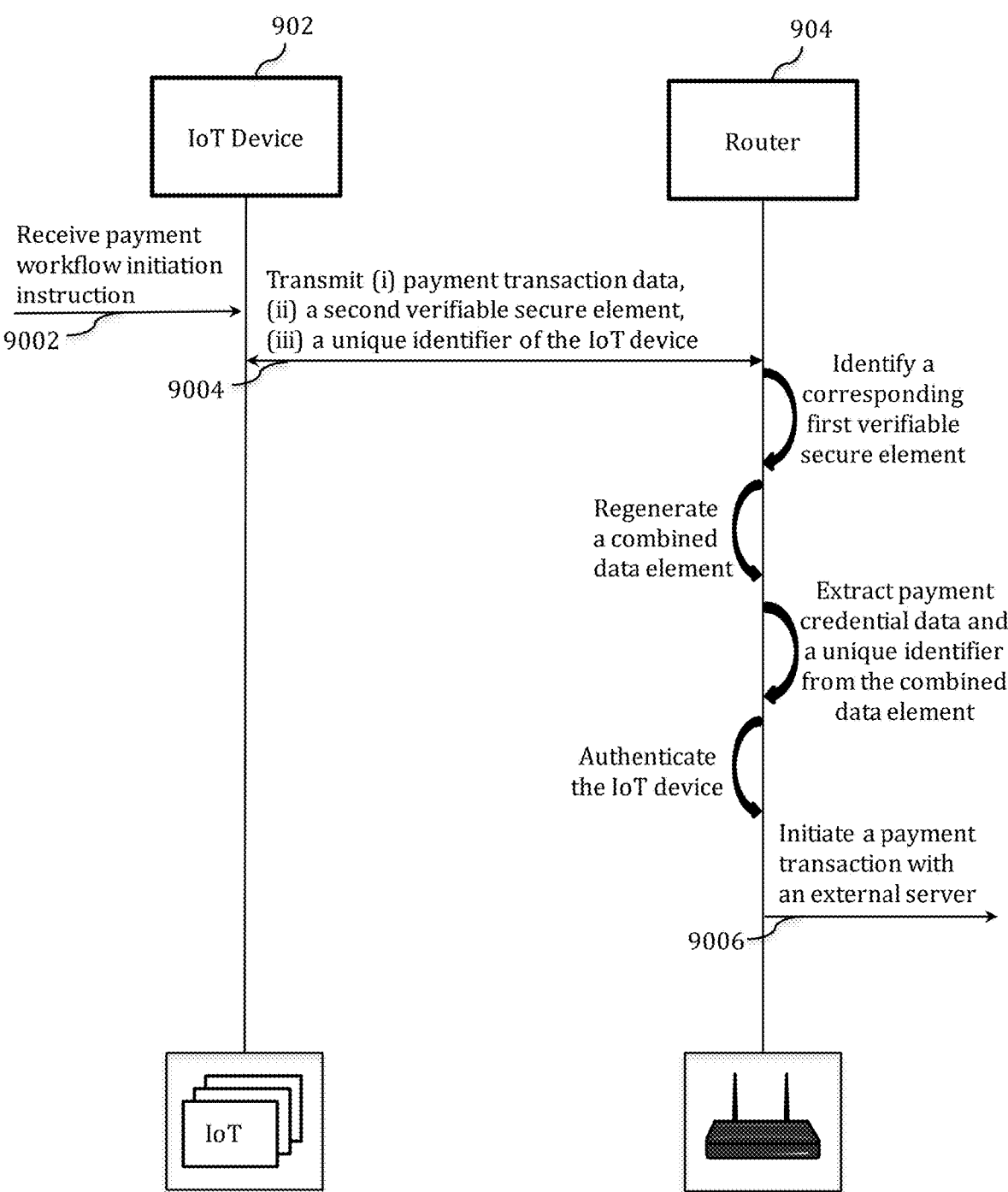
FIG. 9 is a communication flow diagram illustrating the process flow communication between system entities involved in implementing the method of FIG. 8.

FIGS. 8 and 9 as described below illustrate methods by which IoT devices (within the system environment 100 of FIG. 1 that have been provisioned for secure payment transaction implementation using split secret cryptography), can securely implement a payment transaction.

FIG. 8 is a flowchart illustrating a method for enabling an IoT device—that has been provisioned in accordance with the method of FIG. 5—to implement a payment transaction using payment credential data reconstructed from split secret shares. For the purposes of this method, it will be understood that the router and IoT device discussed hereunder are a router-IoT device pair that have been respectively provisioned with a first verifiable secure element and a second verifiable secure element respectively, in accordance with the methods of FIGS. 5 and 6 discussed hereinabove.

Step 802 comprises receiving at a selected IoT device (any of 104a to 104c), an instruction initiating a payment workflow. The instruction initiating a payment workflow can be triggered by (i) an instruction received through client device 106, or (ii) through router 102, or through any other device communicating with the selected IoT device, or (iii) alternatively by an instruction generated by another process flow being implemented within the selected IoT device itself.

Step 804 comprises transmitting from the selected IoT device (any of 104a to 104c) to router 102, an instruction for initiating an electronic payment transaction, comprising (i) payment transaction data, (ii) a second verifiable secure element stored in a memory within or coupled with the selected IoT device (any of 104a to 104c) and (iii) a unique identifier of the selected IoT device (any of 104a to 104c). The payment transaction data can comprise one or more of payee identification data, payee account data identifying a payee account, and transaction amount data identifying a transaction amount. The second verifiable secure element can have been provisioned within the selected IoT device (any of 104a to 104c) through the methods of FIG. 5 and/or FIG. 6. The unique identifier of the selected IoT device (any of 104a to 104c) can comprise the unique identifier that has been used during the implemented methods of FIG. 5 and/or FIG. 6 for generating the second verifiable secure element that has been provisioned within the selected IoT device (any of 104a to 104c).

Step 806 comprises identifying from among data stored within a memory of router 102, a first verifiable secure element associated with the transmitted unique identifier of the selected IoT device (any of 104a to 104c). The first verifiable secure element can be identified by (i) parsing all instances of unique identifiers of IoT devices stored within a memory of router 102 (for example all instances of unique identifiers stored in exemplary data structure 700 of FIG. 7) and (ii) upon identifying a stored unique identifier (i.e. that is stored in a memory of router 102) that matches the transmitted unique identifier of the selected IoT device (any of 104a to 104c), identifying a first verifiable secure element that has been mapped to or associated with the stored unique identifier in accordance with step 512 of the method of FIG. 5.

Step 808 comprises regenerating a combined data element based on the identified first verifiable secure element that has been retrieved from a memory of router 102 and the second verifiable secure element that has been transmitted from the selected IoT device (any of 104a to 104c). The regeneration at step 808 is implemented using a split secret cryptography reconstruction method based on the first verifiable secure element and the second verifiable secure element. The split secret cryptography reconstruction method can correspond to (or comprise a complement of) the split secret cryptography splitting method that has previously been used to generate the first verifiable secure element and the second verifiable secure element from a combined data element (i.e. at step 510 of the method of FIG. 5).

Step 810 comprises extracting from the regenerated combined data element, (i) a payment credential data and (ii) optionally a unique identifier associated with an IoT device.

As discussed at step 508 of the method of FIG. 5, the combined data element comprises both payment credential data and a unique identifier associated with an IoT device—and therefore both of these can be extracted from the combined data element that is regenerated at step 808 of the method of FIG. 8.

Step 812 comprises optionally authenticating the selected IoT device (any of 104a to 104c) by comparing the unique identifier received from said selected IoT device (any of 104a to 104c) at step 804, with the unique identifier extracted from the regenerated combined data element at step 810. If the two unique identifiers match, the selected IoT device (any of 104a to 104c) is treated as authenticated and the method proceeds to step 814. If the two unique identifiers do not match, the selected IoT device (any of 104a to 104c) is considered to have failed the authentication step, and the method terminates without proceeding to step 814.

Step 814 comprises initiating the electronic payment transaction based on the payment transaction data received from the selected IoT device (any of 104a to 104c) at step 804, and the payment credential data extracted at step 810 from the regenerated combined data element. In an embodiment, the electronic payment transaction can be initiated by transmitting the payment transaction data and the payment credential data from router 102 to a payment network or to another entity within an external electronic payment environment (for example, a merchant server, an acquirer server or an issuer server) for implementing the electronic payment transaction.

FIG. 9 is a communication flow diagram illustrating the process flow communication between system entities involved in implementing the method of FIG. 8.

The communication flow commences at step 9002 which comprises receiving at a selected IoT device 902, an instruction initiating a payment workflow. The instruction initiating a payment workflow can be triggered (i) by an instruction received through a client device, or through a router 904, or (ii) through any other device communicating with the selected IoT device 902, or (iii) alternatively by an instruction generated by another process flow being implemented within the selected IoT device 902 itself.

Step 9004 comprises transmitting from the selected IoT device 902 to router 904, an instruction for initiating an electronic payment transaction, comprising (i) payment transaction data, (ii) a second verifiable secure element stored in a memory coupled with the selected IoT device 902 and (iii) a unique identifier of the selected IoT device 902. The payment transaction data can comprise one or more of payee identification data, payee account data identifying a payee account, and transaction amount data identifying a transaction amount. The second verifiable secure element may have been provisioned within the selected IoT device 902 through the methods of FIG. 5 and/or FIG. 6. The unique identifier of the selected IoT device 902 can comprise the unique identifier that has been used during the implemented methods of FIG. 5 and/or FIG. 6 for generating the second verifiable secure element that has been provisioned within the selected IoT device 902.

A first verifiable secure element associated with the transmitted unique identifier of the selected IoT device 902 is identified at router 904. The first verifiable secure element can be identified by (i) parsing all instances of unique identifiers of IoT devices stored within a memory of router 904 (for example all instances of unique identifiers stored in exemplary data structure 700 of FIG. 7) and (ii) upon identifying a stored unique identifier (i.e. that is stored in a memory of router 904) that matches the transmitted unique identifier of the selected IoT device 902, identifying a first verifiable secure element that has been mapped to or associated with the stored unique identifier in accordance with step 512 of the method of FIG. 5.

Thereafter router 904 regenerates a combined data element based on the identified first verifiable secure element that has been retrieved from a memory of router 904 and the second verifiable secure element that has been transmitted from the selected IoT device 902. The regeneration of the combined data element is achieved using a split secret cryptography reconstruction method, and the first and second verifiable secure elements as inputs to the method. The split secret cryptography reconstruction method can correspond to (or comprise a complement of) the split secret cryptography splitting method that has previously been used to generate the first verifiable secure element and the second verifiable secure element from a combined data element (i.e. at step 510 of the method of FIG. 5).

Router 904 then extracts from the regenerated combined data element, (i) a payment credential data and (ii) optionally a unique identifier of an IoT device. As discussed at step 508 of the method of FIG. 5, the combined data element comprises both payment credential data and a unique identifier associated with an IoT device—and therefore both of these can be extracted from the combined data element that is regenerated at router 904.

Router 904 can thereafter optionally authenticate selected IoT device 902 by comparing the unique identifier received from the selected IoT device 902 at step 9004, with the unique identifier that has been extracted from the regenerated combined data element by router 904. If the two unique identifiers match, the selected IoT device 902 is treated as authenticated and the method proceeds further to step 9006. If the two unique identifiers do not match, the selected IoT device 902 is considered to have failed the authentication step, and the method terminates without proceeding further to step 9006.

Step 9006 comprises initiating the electronic payment transaction based on (i) the payment transaction data received from the selected IoT device 902 at step 9004, and (ii) the payment credential data extracted by router 904 from the regenerated combined data element. In an embodiment, the electronic payment transaction can be initiated by transmitting the payment transaction data and the payment credential data from router 904 to a payment network or to another entity within an external electronic payment environment (for example, a merchant server, an acquirer server or an issuer server) for implementing the electronic payment transaction.

Figure 10:
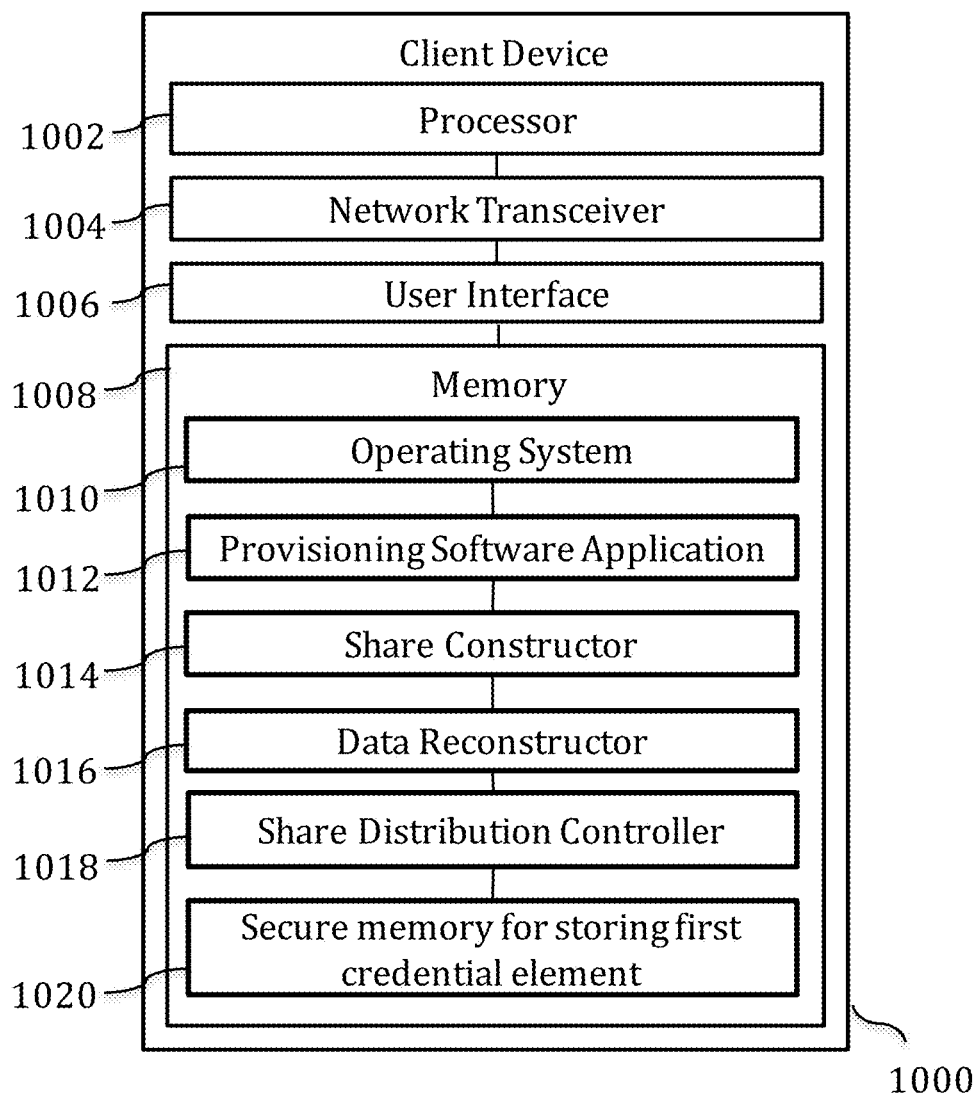
FIG. 10 illustrates an exemplary client device of a type that can be configured to implement the methods of the present invention.

FIG. 10 illustrates an exemplary client device 1000 of a type that can be configured to implement the methods of the present invention.

As shown in FIG. 10, client device 1000 includes (i) a processor 1002, (ii) a network transceiver 1004 configured to enable transmission and receiving of network communications, (iii) a user interface 1006 configured to enable a user of client device 1000 to input data to, access data within, and interact with and control client device 1000, and (iv) a memory 1008.

In an exemplary embodiment, memory 1008 can have stored therewithin, one or more of (i) an operating system 1010 configured for managing device hardware and software resources and that provides common services for software programs implemented within client device 1000, (ii) a provisioning software application configured to provision client device 900 and a router (for example router 102)

respectively with a first credential element and a second credential element in accordance with the method steps of FIG. 3, (iii) a share constructor 1014 configured to split payment credential data into a first credential element and a second credential element using a split secret cryptography method in accordance with step 304 of FIG. 3, (iv) a share distribution controller configured to implement storage of a first credential element in a memory coupled with or within client device 1000 (in accordance with step 306 of FIG. 3), and to implement storage of the second credential element in a memory coupled with or within a router 102 (in accordance with step 308 of FIG. 3), and (v) a secure memory 1020 for storing a first credential element within client device 1000.

Figure 11:
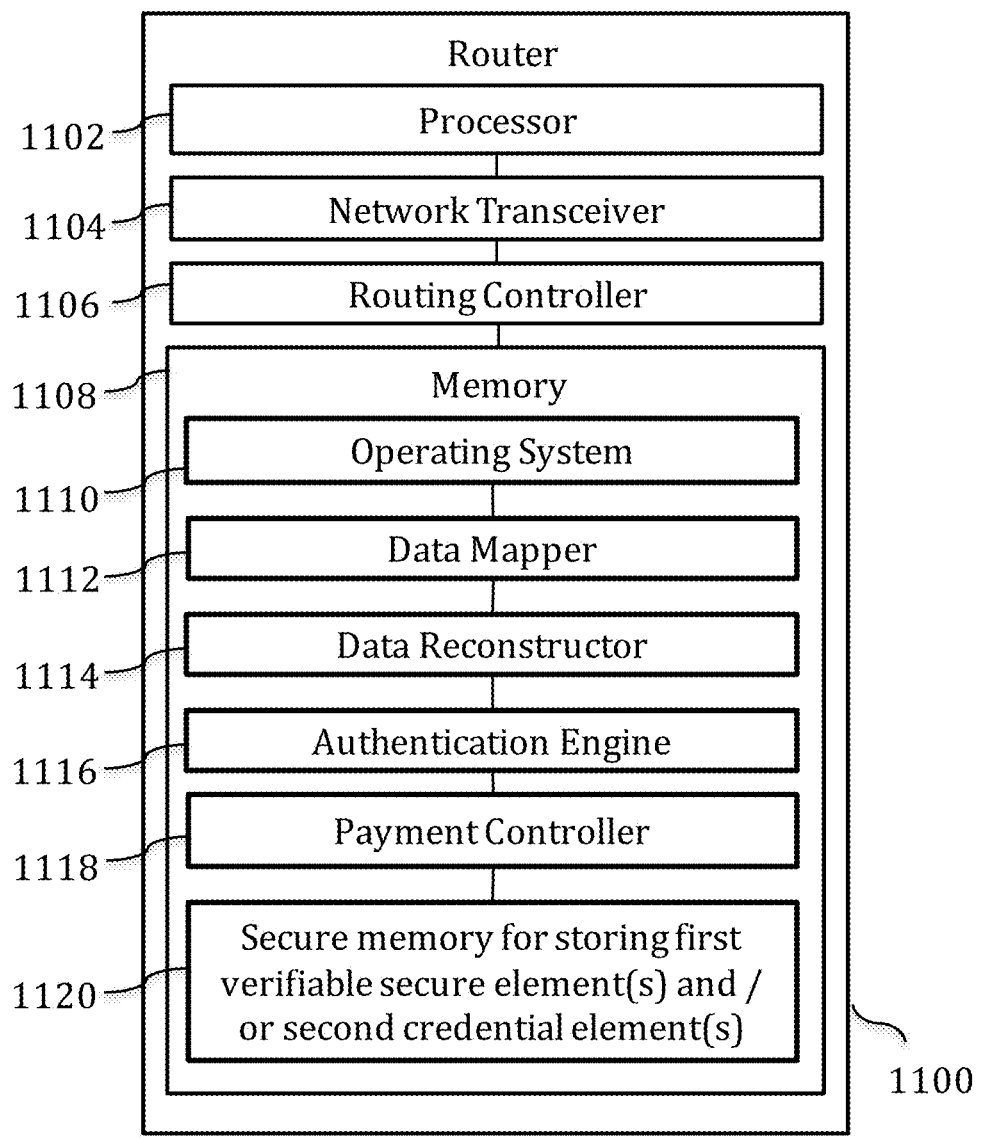
FIG. 11 illustrates an exemplary router of a type that can be configured to implement the methods of the present invention.

FIG. 11 illustrates an exemplary router 1100 of a type that can be configured to implement the methods of the present invention.

As shown in FIG. 11, router 1100 includes (i) a processor 1102, (ii) a network transceiver 1104 configured to enable transmission and receiving of network communications, (iii) a routing controller 1106 configured to implement network routing and network gateway functionalities and operations of router 1100, and (iv) a memory 1108.

In an exemplary embodiment, memory 1108 can have stored therewithin, one or more of (i) an operating system 1110 configured for managing device hardware and software resources and that provides common services for software programs implemented within router 1100, (ii) a data mapper 1112 configured to map an association between first verifiable secure elements and corresponding unique identifiers of IoT devices in accordance with the teachings of step 512 of FIG. 5, (iii) a data reconstructer 1114 configured for (a) regenerating payment credential data based on first credential data and second credential data using a split secret cryptography reconstruction method, in accordance with step 504 of FIG. 5, and/or (b) regenerating a combined data element based on a first verifiable secure element and a second verifiable secure element in accordance with the teachings of step 808 of FIG. 8, (iv) an authentication engine 1116 configured to authenticate an IoT device in accordance with step 812 of FIG. 8, (v) a payment controller 1118 configured to initiate an electronic payment transaction in accordance with step 814 of FIG. 8, and (vi) a secure memory 1120 (*a*) configured for storing second credential element(s) in accordance with step 308 of FIG. 3, and/or (b) configured for storing a first verifiable secure element(s) in accordance with step 512 of FIG. 5.

Figure 12:
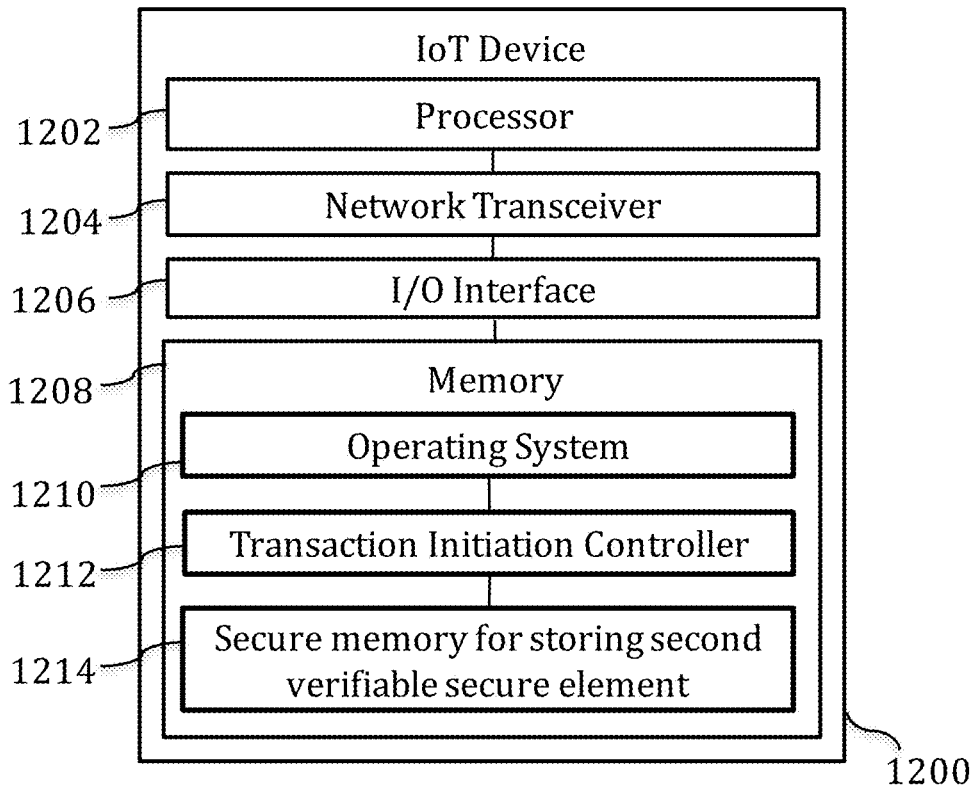
FIG. 12 illustrates an exemplary IoT device of a type that can be configured to implement the methods of the present invention.

FIG. 12 illustrates an exemplary IoT device 1200 of a type that can be configured to implement the methods of the present invention.

As shown in FIG. 12, IoT device 1200 includes (i) a processor 1202, (ii) a network transceiver 1204 configured to enable transmission and receiving of network communications, (iii) an I/O interface 1206 configured to handle internal and external input-output interface functionality for IoT device 1200, and (iv) a memory 1208.

In an exemplary embodiment, memory 1208 can have stored therewithin, one or more of (i) an operating system 1210 configured for managing device hardware and software resources and that provides common services for software programs implemented within IoT device 1200, (ii) a transaction initiation controller 1212 configured for initiating a payment workflow through IoT device 1200—for example, in accordance with step 802 of FIG. 8, and (iii) a secure memory 1214 configured for storing a second verifiable secure element within IoT device 1200 in accordance with step 514 of FIG. 5.

Figure 13:
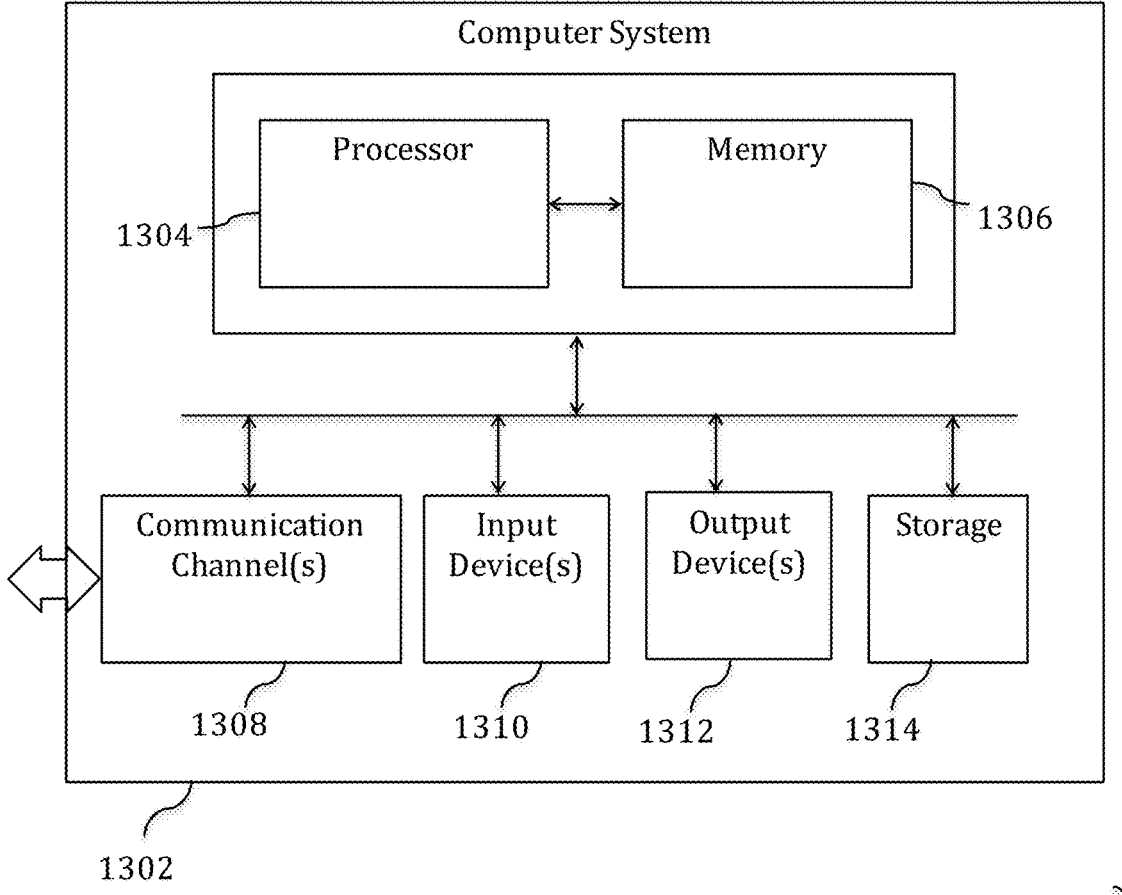
FIG. 13 illustrates an exemplary computer system according to which various embodiments of the present invention can be implemented.

FIG. 13 illustrates an exemplary computer system 1300 according to which various embodiments of the present invention can be implemented.

System 1300 includes computer system 1302 which in turn comprises one or more processors 1304 and at least one memory 1306. Processor 1304 is configured to execute program instructions—and can be a real processor or a virtual processor. It will be understood that computer system 1302 does not suggest any limitation as to scope of use or functionality of described embodiments. The computer system 1302 can include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1302 in accordance with the present invention can include one or more servers, desktops, laptops, tablets, smart phones, mobile phones, mobile communication devices, phablets and personal digital assistants. In an embodiment of the present invention, the memory 1306 can store software for implementing various embodiments of the present invention. The computer system 1302 can have additional components. For example, the computer system 1302 can include one or more communication channels 1308, one or more input devices 1310, one or more output devices 1312, and storage 1314. An interconnection mechanism (not shown) such as a bus, controller, or network, interconnects the components of the computer system 1302. In various embodiments of the present invention, operating system software (not shown) provides an operating environment for various applications and software executing in the computer system 1302 using a processor 1304, and manages different functionalities of the components of the computer system 1302.

The communication channel(s) 1308 allow communication over a communication medium to various other computing entities. The communication medium provides information such as program instructions, or other data in a communication media. The communication media includes, but is not limited to, wired or contactless methodologies implemented with an electrical, optical, RF, infrared, acoustic, microwave, Bluetooth or other transmission media.

The input device(s) 1310 can include, but is not limited to, a touch screen, a keyboard, mouse, pen, joystick, trackball, a voice device, a scanning device, or any another device that is capable of providing input to the computer system 1302. In an embodiment of the present invention, the input device (s) 1310 can be a sound card or similar device that accepts audio input in analog or digital form. The output device(s) 1312 can include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1302.

The storage 1314 can include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1302. In various embodiments of the present invention, the storage 1314 can contain program instructions for implementing any of the described embodiments.

In an embodiment of the present invention, the computer system 1302 is part of a distributed network or a part of a set of available cloud resources.

The present invention can be implemented in numerous ways including as a system, a method, or a computer program product such as a computer readable storage medium or a computer network wherein programming instructions are communicated from a remote location.

The present invention can suitably be embodied as a computer program product for use with the computer system 1302. The method described herein is typically implemented as a computer program product, comprising a set of program instructions that is executed by the computer system 1302 or any other similar device. The set of program instructions can be a series of computer readable codes stored on a tangible medium, such as a computer readable storage medium (storage 1314), for example, diskette, CD-ROM, ROM, flash drives or hard disk, or transmittable to the computer system 1302, via a modem or other interface device, over either a tangible medium, including but not limited to optical or analogue communications channel(s) 1308. The implementation of the invention as a computer program product can be in an intangible form using contactless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions can embody all or part of the functionality previously described herein.

Based on the above, it would be understood that the present invention offers significant advantages, as it enables enable IoT devices to securely access payment credential data, without exposing the payment credential data to security risks.

While the exemplary embodiments of the present invention are described and illustrated herein, it will be appreciated that they are merely illustrative. It will be understood by those skilled in the art that various modifications in form and detail can be made therein without departing from or offending the scope of the invention as defined by the appended claims. Additionally, the invention illustratively disclose herein suitably can be practiced in the absence of any element which is not specifically disclosed herein—and in a particular embodiment that is specifically contemplated, the invention is intended to be practiced in the absence of any one or more element which are not specifically disclosed herein.

What is claimed is:

1. A method for securely provisioning an internet-of-things (IoT) device, the method comprising:

applying, by a client device, split secret cryptography-based splitting to a payment credential to create a first credential element and a second credential element from the payment credential;

storing, by the client device, the first credential element in a memory within the client device;

storing the second credential element in a memory of a router coupled in communication with the client device;

retrieving the first credential element from the memory within the client device;

fetching the second credential element from the router that is coupled in communication with each of the client device and an IoT device;

regenerating, by the client device, the payment credential by applying split secret cryptography-based reconstruction to the retrieved first credential element and the fetched second credential element;

fetching, by the client device, from the IoT device, a unique identifier associated with the IoT device;

generating, by the client device, a combined data element comprising the regenerated payment credential and the fetched unique identifier associated with the IoT device;

applying, by the client device, split secret cryptography-based splitting to the combined data element to generate a first verifiable secure element and a second verifiable secure element;

storing, by the client device, in the memory of the router, the first verifiable secure element and the retrieved unique identifier;

mapping, by the client device, the first verifiable secure element and the fetched unique identifier to each other;

storing, by the client device, the second verifiable secure element in a memory within the IoT device; and then, in response to initiation of a payment workflow at the IoT device:

transmitting, by the IoT device, to the router, payment transaction data, the second verifiable secure element stored within the memory of the IoT device, and the unique identifier associated with the IoT device;

identifying, by the router, a first verifiable secure element associated with the received unique identifier associated with the IoT device, from among data stored within the memory of the router;

regenerating, by the router, the combined data element by applying split secret cryptography-based reconstruction to both of the identified first verifiable secure element and the second verifiable secure element received from the IoT device;

extracting, by the router, from the regenerated combined data element, the payment credential; and initiating, by the router, an electronic payment transaction based on the payment transaction data received from the IoT device and the payment credential extracted from the regenerated combined data element.

2. The method of claim 1, further comprising deleting from the client device one or more of the regenerated payment credential, the combined data element, the first verifiable secure element, and the second verifiable secure element.

3. The method of claim 1, further comprising authenticating, by the router, the IoT device by comparing the unique identifier associated with the IoT device that has been received from the IoT device, with a unique identifier extracted from the regenerated combined data element.

4. A system for securely provisioning an internet-of-things (IoT) device for implementing an electronic payment transaction, the system comprising:

a router; and a client device coupled in communication with the router, wherein the client device is configured, by first executable instructions, to:

apply a split secret cryptography-based splitting to a payment credential, to create a first credential element and a second credential element from the payment credential;

store the first credential element in a memory within the client device;

store the second credential element in a memory of the router;

retrieve the first credential element from the memory within the client device and the second credential element from the memory of the router;

regenerate the payment credential by applying split secret cryptography-based reconstruction to the retrieved first credential element and the retrieved second credential element;

retrieve a unique identifier associated with an IoT device;

generate a combined data element comprising the regenerated payment credential and the retrieved unique identifier associated with the IoT device;

apply split secret cryptography-based splitting to the combined data element to generate a first verifiable secure element and a second verifiable secure element;

store the first verifiable secure element and the retrieved unique identifier in the memory of the router;

map the first verifiable secure element and the retrieved unique identifier to each other; and store the second verifiable secure element in a memory within the IoT device; and wherein the router is configured, by second executable instructions, in response to an instruction initiating a payment workflow at the IoT device, to:

receive, from the IoT device, payment transaction data, the second verifiable secure element stored within the memory of the IoT device, and the unique identifier associated with the IoT device;

identify a first verifiable secure element associated with the received unique identifier associated with the IoT device, from among data stored within the memory of the router;

regenerate the combined data element by applying split secret cryptography-based reconstruction to both of the identified first verifiable secure element and the second verifiable secure element received from the IoT device;

extract the payment credential from the regenerated combined data element; and initiate the electronic payment transaction based on the payment transaction data received from the IoT device and the payment credential extracted from the regenerated combined data element.

5. The system as claimed in claim 4, wherein the client device is configured, by the first executable instructions, to delete one or more of the regenerated payment credential, the combined data element, the first verifiable secure element and the second verifiable secure element.

6. The system of claim 4, wherein the router is configured, by the second executable instructions, to authenticate the IoT device by comparing the unique identifier associated with the IoT device that has been received from the IoT device, with a unique identifier extracted from the regenerated combined data element.

* * * * *